United States Patent [19]
Uchida

[11] 3,973,636
[45] Aug. 10, 1976

[54] THERMOBALANCE
[75] Inventor: Hiroshi Uchida, Tokyo, Japan
[73] Assignee: Rigaku Denki Company Limited, Tokyo, Japan
[22] Filed: July 3, 1975
[21] Appl. No.: 592,900

[52] U.S. Cl. .............................. 177/132; 177/190; 177/210; 177/212
[51] Int. Cl.² ..................... G01G 1/18; G01G 19/00
[58] Field of Search ........... 177/132, 150, 190, 212, 177/246, 210

[56] References Cited
UNITED STATES PATENTS

| | | | |
|---|---|---|---|
| 2,407,513 | 9/1946 | Pounds | 177/210 |
| 2,754,109 | 7/1956 | Eyraud et al. | 177/210 |
| 3,717,210 | 2/1973 | Sieswerda | 177/212 X |

*Primary Examiner*—Joseph W. Hartary
*Attorney, Agent, or Firm*—A. W. Breiner

[57] ABSTRACT

A thermobalance wherein fulcra are provided respectively at the tips of both arms in a main balance, auxiliary balances are suspended respectively on said fulcra, one arm of the above mentioned auxiliary balance is extended near to a vertical line passing through the fulcrum of the main balance and a sample and standard sample are suspended on the tips of the respective arms and are arranged in the same furnace.

A thermobalance wherein a connecting rod of the same length as of an arm of a main balance is arranged in parallel with the above mentioned arm and is rotatably fitted to a point of intersection of a vertical line passing through the fulcrum of the main balance with said connecting rod and two vertically arranged auxiliary balances are rotatably fitted respectively to both ends of the arm of the main balance and both ends of the connecting rod so as to form a link mechanism, the above mentioned auxiliary balances are bent and a sample and standard sample fitted to their tips are arranged near the above mentioned vertical line and are contained in the same furnace.

5 Claims, 3 Drawing Figures

THERMOBALANCE

This invention relates to thermobalances.

With the prevalence of thermobalances, a high sensitivity and high precision are required. However, as a sample is arranged in a heating furnace, the apparent weight of the sample will vary with the fluctuation of the convection and buoyancy of the gas. Further, the error in the weight detection thereby will vary so complicatedly with the shapes and sizes of the sample and its supporting part, the temperature, the kind of the gas and the structure of the furnace, the velocity of the temperature variation and the pressure as to be very difficult to correct.

Therefore, an object of the present invention is to provide a thermobalance which produces no error with the fluctuation of the convection and buoyancy, has a high sensitivity and high precision and can easily adjust the balance.

Figure 1:
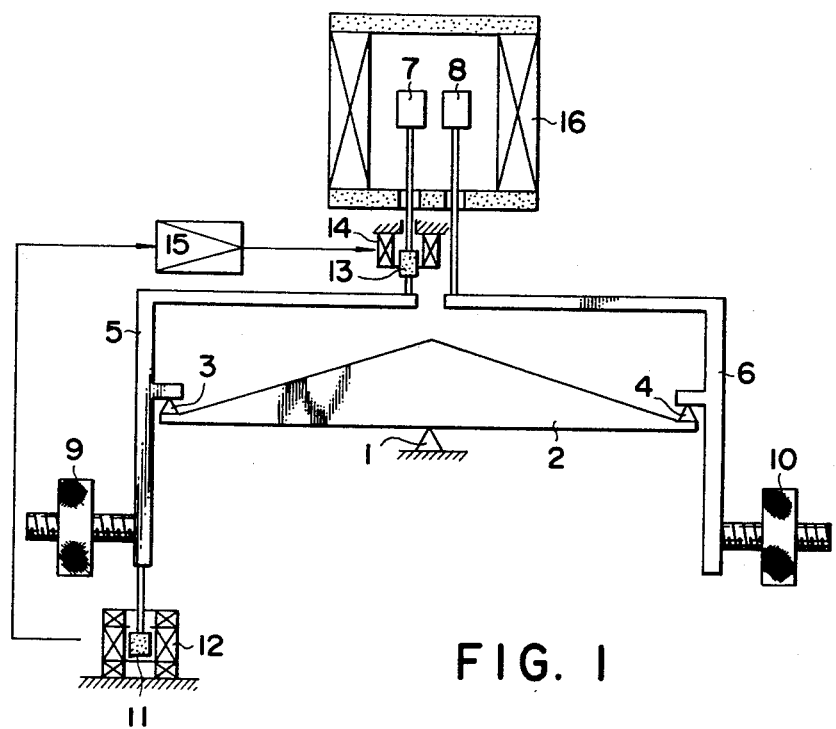
FIG. 1 is a schematic elevation of a first embodiment of the thermobalance according to the present invention.

In FIG. 1 which is an elevation of a first embodiment of the present invention, fulcra 3 and 4 are provided respectively at the tips of both arms of a main balance 2 supported on a fulcrum 1 and auxiliary balances 5 and 6 are suspended respectively on these fulcra. The auxiliary balances 5 and 6 have respective arms arranged above the main balance 2 and extended near to a vertical line passing through the fulcrum 1 of the main balance and support a sample container 7 and standard sample container 8 with respective stays 21 and 22 fitted to the tips of the arms parallelly with each other. The other arms of the auxiliary balances 5 and 6 are screws which are positioned below the main balance and extended outward and to which balance weights 9 and 10 are respectively screwed. Further, a magnetic core 11 is fixed to the arms to which is fitted the balance weight in the auxiliary balance 5 fitted with the sample container 7 and is fitted to a coil 12 of a differential transformer. At the same time, a magnet 13 is fixed to the arm fitted with the sample container and is fitted to a control coil 14. The output of the secondary coil in the above mentioned differential transformer is amplified with an amplifier and is added to the control coil. The sample container 7 and standard sample container 8 and charged respectively with any sample varying in the weight with the temperature and a proper standard sample not varying in the weight and are arranged in one electric furnace 16.

In the above described apparatus, as the auxiliary balances 5 and 6 are so formed that the their centers of gravity may be located respectively below the fulcra 3 and 4, when the weights 9 and 10 are balanced by adjustment, the auxiliary balances will have an automatically returning function and, as they are designed to be comparatively low in the sensitivity, they will not substantially respond to the apparent weight variation of the containers 7 and 8 due to the variation of the convection or buoyance within the furnace 16. However, as the main balance 2 is so designed as to have a sensitivity high enough, it will easily respond to the weight variation of the sample within the container 7.

When this main balance 2 inclines, the magnetic core 11 fitted in the coil 12 of the differential transformer will move and an output will be sent out of the secondary coil. As the amplifier 15 amplifies this output and adds it to the control coil 14, the relation between the polarity of the current and the polarity of the magnet 13 is properly selected, the sample weight variation will be compensated, the balance of the main balance 2 and auxiliary balance 5 will be automatically held and the weight vatiation of the sample will be able to be detected by the output of the amplifier 15. Therefore, in case the temperature of the furnace 16 is varied by balancing the main balance 2 and auxiliary balances 5 and 6 with the adjustment of the weights 9 and 10 and a bias current added to the control coil 14, when a weight variation is caused to the sample within the container 7 by the temperature variation, an output corresponding to this weight variation will be sent out of the amplifier 15 and the main balance 2 and auxiliary balance 5 will automatically keep a balanced state by the above described feedback circuit.

When the density of the gas varies with the temperature variation of the furnace 16, the buoyancy applied to the containers 7 and 8 will vary and, when the convection of the gas within the furnace fluctuates with the temperature variation, the force in the vertical direction added to said container will vary. However, if the containers 7 and 8 are parallelly placed in substantially the same positions within the furnace 16, the buoyancy and the force by the convection acting on them will always keep substantially equal values irrespective of the fluctuation and will have no influence on the inclination of the main balance 2. Further, the auxiliary balances 5 and 6, have a comparatively low sensitivity as described above, the inclination by the above mentioned forces is very slight and therefore the operation of the balance will be little influenced. Therefore, only the actual weight variation of the sample contained in the container 7 will be detected by the main balance 2 of a high sensitivity and no error by the fluctuation of the buoyancy and convection will be produced.

Figure 2:
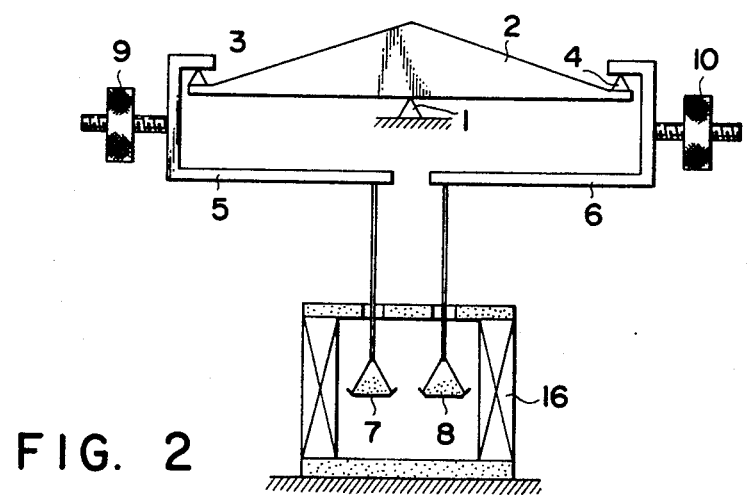
FIG. 2 is the same schematic elevation as in FIG. 1 of a second embodiment.

In FIG. 2 showing a second embodiment of the present invention, the respective arms of the auxiliary balances 5 and 6 suspended on the tips of both arms of the main balance 2 are extended near to the vertical line passing through the fulcrum 1 of the above mentioned main balance below it and the sample container 7 and standard sample container 8 suspended on the tips of the arms are thereby arranged in one electric furnace 16. It is evident that the above described operation and effect are obtained even by arranging the furnace 16 below the main balance 2 by such formation. Further, when a displacement detector by such differential transformer as is shown in FIG. 1 or by a photoelectric device and a control coil to which is added its output as amplified are provided on a proper arm of the auxiliary balance 5 or 6, such automatically balancing function as is explained with reference to FIG. 1 will be obtained.

Figure 3:
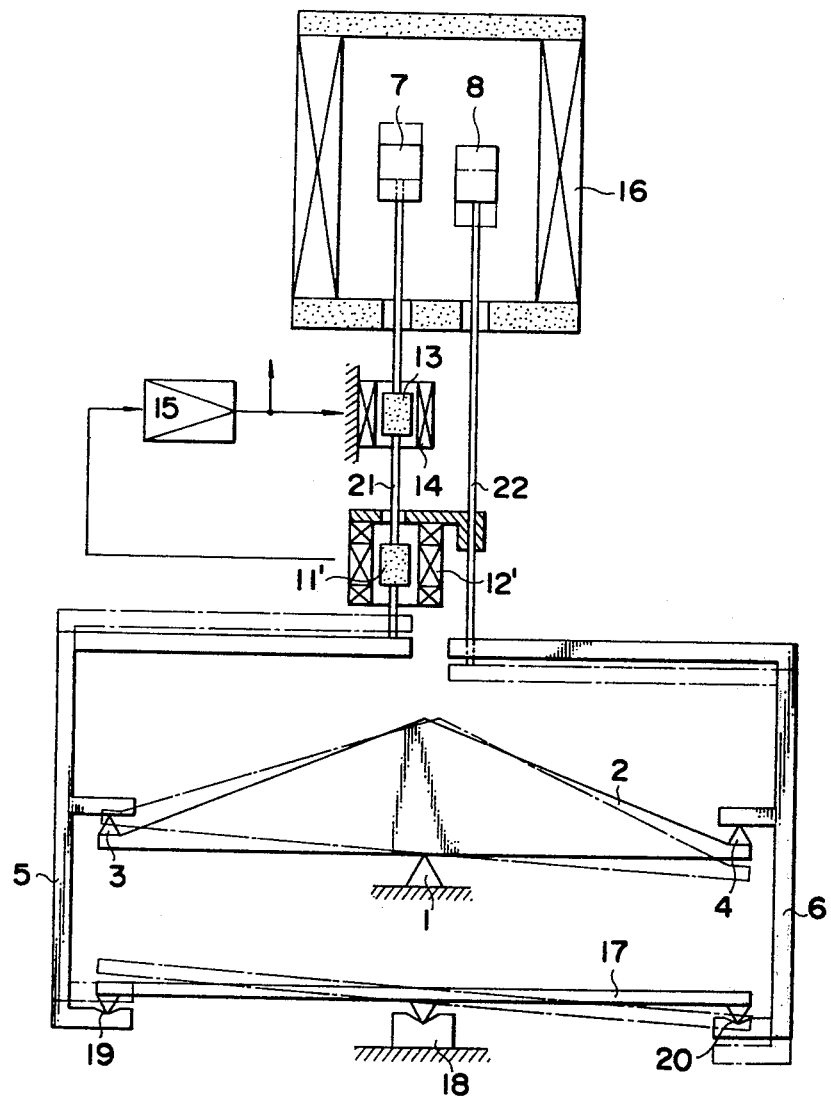
FIG. 3 is the same view as in FIG. 1 of a third embodiment.

In FIG. 3 which is an elevation of a third embodiment of the present invention, a connecting rod 17 of the same length as the arm of the main balance 2 supported by the fulcrum 1 is arranged in parallel with said arm, a fulcrum 18 is provided at a point of intersection of the vertical line passing through the above mentioned fulcrum 1 with said connecting rod 17 and the connecting rod 17 is rotatably fitted to this fulcrum. Further, two auxiliary balances 5 and 6 are arranged vertically on both sides of the main balance, are suspended on the fulcra 3 and 4 at both ends of the arm of the main balance 2 and are rotatably fitted to fulcra 19 and 20 at both ends of the connecting rod 17. Therefore, the arm of the main balance 2, the connecting rod 17 and the auxiliary balances 5 and 6 form a link mechanism but, the same as in the above mentioned first embodiment, the auxiliary balances 5 and 6 are horizontally bent in the upper parts, further vertical stays 21 and 22 are provided at their tips and the sample container 7 and standard sample container 8 are fitted to the upper ends of these stays. That is to say, the containers 7 and 8 respectively for the sample and standard sample are arranged near to the vertical line passing through the fulcrum 1 of the main balance and are container in the same electric furnace 16. Further, a magnetic core 11' and magnet 12' are fitted to the stay 21 fitted with the sample container, a coil 12' of the differential transformer is fitted to the other stay 22, the magnetic core 11' is fitted to the coil 12' and the coil 13 is fitted to the control coil 14 fitted to the base. The output obtained from the recondary coil of the above mentioned differential transformer is amplified with the amplifier 15 and is added to the control coil 14. By the way, from the problem in the working, the connecting rod 17 may be divided into two at the fulcrum 18 and each division may be rotatably fitted at the end to said fulcrum.

In the apparatus of the above described embodiment, the weight of the auxiliary balance 5 and the sample container 7, magnetic core 11' and magnet 13 fitted to it will be added to the fulcrum 3 at the tip of the arm of the main balance 2 and the weight of the auxiliary balance 6 and the standard sample container 8 and the coil 12' of the differential transformer fitted to it will be added to the other fulcrum 4. Therefore, when the forces applied to the above mentioned fulcra 3 and 4 are unbalanced, the balance will be stabilized with an inclination corresponding to the unbalance. However, as the arm of the main balance 2, the connecting rod 17 and the auxiliary balances 5 and 6 form a link mechanism of a parallelogram fitted to the base part at the fulcra 1 and 18 as described above, they will be displaced as in the chain lines by the inclination of the main balance and the auxiliary balances 5 and 6 will always keep a vertical state. That is to say, even in case the main balance inclines, when the inclination is small, the containers 7 and 8 respectively for the sample and standard sample will be displaced in the vertical direction and their displacement in the horizontal direction will be well negligible. Further, the same as in the above mentioned first embodiment, if the magnetic core 11' fitted to the stay 21 is moved upward by the inclination of the main balance, the coil 12' fitted to the other stay 22 will be displaced downward, therefore differential transformer formed of them will detect the inclination will be set out of the secondary coil. As this output is amplified with the amplifier 15 and is added to the control coil 14, if the polarities of the coil current and magnet 13 are properly selected, the weight variation of the sample will be compensated, the main balance will automatically keep a balanced state and the weight variation of the sample will be able to be detected with the output of the amplifier. That is to say, when the containers 7 and 8 are charged respectively with any sample and a proper standard sample not varying in weight in the measuring temperature range and the bias current of the control coil 14 is adjusted, the main balance will keep a balanced state but, in case the temperature of the furnace 16 is varied in this state, when the weight of the sample in the container 7 is varied by the temperature variation, an output corresponding to this weight variation will be sent out of the amplifier and the main balance will automatically keep a balanced state by the above described feedback circuit.

When the density of the gas varies with the temperature variation of the furnace 16, the buoyancy applied to the containers 7 and 8 will vary and, when the convection of the gas within the furnace fluctuates with the temperature variation, the force in the vertical direction applied to said container will vary. However, if the containers 7 and 8 are parallelly placed in substantially the same positions within the furnace, the buoyancy and the force by the convection acting on them will always keep substantially equal values irrespective of the fluctuation and will have no influence on the inclination of the arm of the main balance 2. Therefore, only the weight variation of the sample contained in the container 7 will be detected by the main balance and no error by the fluctuation of the buoyancy and convection will be produced.

As explained above with reference to the embodiments, in the present invention, auxiliary balances are further suspended respectively on the tips of both arms of a main balance having a high sensitivity and a sample container and standard sample container are fitted respectively to the tips of the arms of the auxiliary balances, are arranged near a vertical line passing through the fulcrum of the main balance and are contained in the same furnace or a link mechanism is formed of the arm of the main balance, the auxiliary balances of the sample and standard sample and a connecting rod connecting them and the sample and the sample and standard sample fitted respectively to the above mentioned auxiliary balances are thereby contained in the same furnace. Therefore, the buoyancy by the temperature variation of the furnace and the force by the convention will be canceled with each other and will have no influence on the detection of the weight variation of the sample and therefore the heat weight can be analyzed at a high sensitivity and high precision. As the auxiliary balances hold fixed positions by the weights or link mechanism, the main balance will be easily adjusted and, as the sample and standard sample are contained in the same furnace, a differential heat weight analysis can be made by simultaneously detecting the temperature difference between them.

What is claimed is:

1. A thermobalance comprising a main balance provided with fulcra respectively at the tips of both arms, a pair of auxiliary balances suspended respectively on said fulcra, arms of said auxiliary balances extended near to a vertical line passing through the fulcrum of said main balance and fitted respectively with a sample container and standard sample container at the tips and balancing means provided respectively on the auxiliary balances, said sample container and standard sample container being parallelly placed within the same furnace.

2. A thermobalance according to claim 1 wherein said auxiliary balance fitted with said sample container is further provided with an electric second balancing means.

3. A thermobalance according to claim 1 wherein said balancing means comprises a screw projecting out of the other arm of said auxiliary balance and a weight screwed to said screw.

4. A thermobalance according to claim 1 wherein said balancing means is a link mechanism consisting of the arm of the main balance, the other arm of the auxiliary balance and a connecting rod of the same length as of the main balance and rotatably fitted to the end of the other arm of the auxiliary balance.

5. A thermobalance according to claim 2 wherein said second balancing means comprises two sets of a pair of magnets and a coil of a differential transformer and the respective sets are electrically connected with each other through an amplifier.

* * * * *